Nov. 18, 1958 S. METZGER 2,861,128

MULTIPLEX BRANCH REPEATER STATION

Filed Nov. 12, 1952 4 Sheets-Sheet 1

INVENTOR
SIDNEY METZGER
BY Percy P. Lantzy
ATTORNEY

INVENTOR
SIDNEY METZGER
BY Percy P. Lantzy
ATTORNEY

MULTIPLEX BRANCH REPEATER STATION

Filed Nov. 12, 1952 4 Sheets-Sheet 3

INVENTOR
SIDNEY METZGER
BY Percy P. Lantzy
ATTORNEY

FORMATION OF PULSE TRAINS FOR THE EASTERN BRANCH

INVENTOR
SIDNEY METZGER
BY [signature]
ATTORNEY 2,861,128

MULTIPLEX BRANCH REPEATER STATION

Sidney Metzger, Bergenfield, N. J., assignor to International Telephone and Telegraph Corporation, a corporation of Maryland Application November 12, 1952, Serial No. 319,930

10 Claims. (Cl. 179—15)

This invention relates to pulse communication systems and more particularly to branch repeater stations incorporated in a pulse time modulation (PTM) type communication system.

In the application of microwave relay links situations often arise where the main line is required to branch, forming a Y, an X or other multiple branch junction. A communication arrangement is usually provided at such junctions whereby certain signals traveling either on the main line or on branch lines are re-routed as may be desired. For example it may be desirable to provide a means to remove a particular signal from the pulse train of the main transmission line and insert this signal into a pulse train traveling on a branch transmission line, and vice versa.

Any of the known types of pulse transmission systems may be employed herein such as pulse amplitude, width, code, or time modulation. However, the PTM principle of multiplex communication has been found desirable due to the large channel handling capabilities within a given frequency bandwidth. As is familiar to those skilled in the art, the signal from each voice channel is sampled periodically at a rate higher than the highest frequency transmitted, and the instantaneous potential at the time of sampling is made to determine the time of emission of a pulse from the transmitter. A regularly timed marker pulse or signal of special wave form, preferably the double-pulse type, the generation of which is fully described in the patent to D. D. Grieg, #2,484,591, issued October 25, 1949, entitled "Multichannel System," supplies a suitable time reference at the receiver. The interval between the time of arrival of the marker pulse and an interleaved pulse of any particular channel is measured and employed to generate an output signal at the receiver conforming to the input signal at the transmitter within the usual limitations of distortion and noise specified for the system.

Where a microwave relay system is employed having an arrangement as above described wherein transmission paths may intersect the main transmission path or a plurality of transmission paths situated at various angles from the junction point with respect to the main transmission path, it is desirable that the traffic re-routing at the junction or branch repeater station be such that there is no wasting of channel spaces available for expansion, or such that there will be no need of adding more multiplex terminal equipment with its attendant cost and maintenance. This may be accomplished by providing a means of directly re-routing individual channel pulses as necessary, removing a particular channel pulse from one pulse train transmitted in a given direction and properly inserting this removed channel pulse into a pulse train being transmitted at a given angle to the path of the original pulse train, this method of interconnection being the basis of the invention now under consideration.

One of the previous methods of accomplishing the desired re-routing is to make the junction repeater station an audio station which requires demodulation of all channels of all pulse trains to audio, interconnecting the channels of the various pulse trains as desired, and then remodulating them for desired re-transmission. This is quite costly in equipment, and equally or more important, is quite costly in terms of maintenance and as potential trouble sources. Since it is desirous that the junction repeater station be unattended, standby multiplex equipment would be required with the necessary switching and alarm features. Further the additional demodulation and re-modulation is a further source of distortion.

A second method is to route the pulse train over a loop to an intermediate branch station, where all channels are demodulated to audio by multiplex equipment. A second multiplex equipment connected thereto provides for re-modulation and passage to the mainline junction station for continued transmission to the next terminal on the mainline. This routing method effectively reduces the junction repeater station to a T junction by adding the independent R. F. path forming a loop between such intermediate branch station and junction repeater station. This method requires the addition of an R. F. link and multiplex terminal equipment, but more important than the extra cost and attendant maintenance, is the fact that channel pulse positions are wasted by looping the channel traffic through the intermediate branch terminal.

An object of the present invention is a provision of a means to directly re-route individual channel pulses received at a primarily unattended junction repeater station which is highly flexible, efficient, and has a low maintenance cost.

Another object of the present invention is a provision of a means wherein a plurality of pulse trains arriving at a junction repeater station will not directly affect one another, and any desired channel pulse or pulses of one train may be directly re-routed by insertion in other predetermined ones of the pulse trains being transmitted from said junction station.

Still another object of the present invention is the provision of a circuit which is completely flexible as regards the routing of channel pulses from the junction repeater station without the addition of extra major equipment and without the disadvantage of demodulating the incoming signal to audio and interconnecting at audio to form a new pulse train for transmission with the resultant deterioration in distortion, frequency response, and crosstalk.

A feature of this invention is the means for synchronizing all pulse trains arriving at the junction repeater to eliminate relative movement or displacement of the pulses in one train with respect to pulses in another train.

Still another feature of this invention is the selection of one of the pulse trains arriving at the junction repeater to be the master pulse train, preferably the pulse train of the branch having the least number of relay links. This master pulse train is then fed at the junction station to a marker separator unit and hence to a delay device for providing gate pulses at each of the plurality of channel pulses per train. With all received pulse trains locked in the same phase, any of the gate pulses or any predetermined group thereof may be judiciously used to select a channel pulse or group of channel pulses from any pulse train making it possible to form a pulse train for transmission to any given terminal composed of several channel pulses from the pulse trains of a plurality of branch lines.

The above-mentioned and other features and objects of this invention will become more apparent by reference to the following description taken in conjunction with the accompanying drawings, in which.

Figure 1:
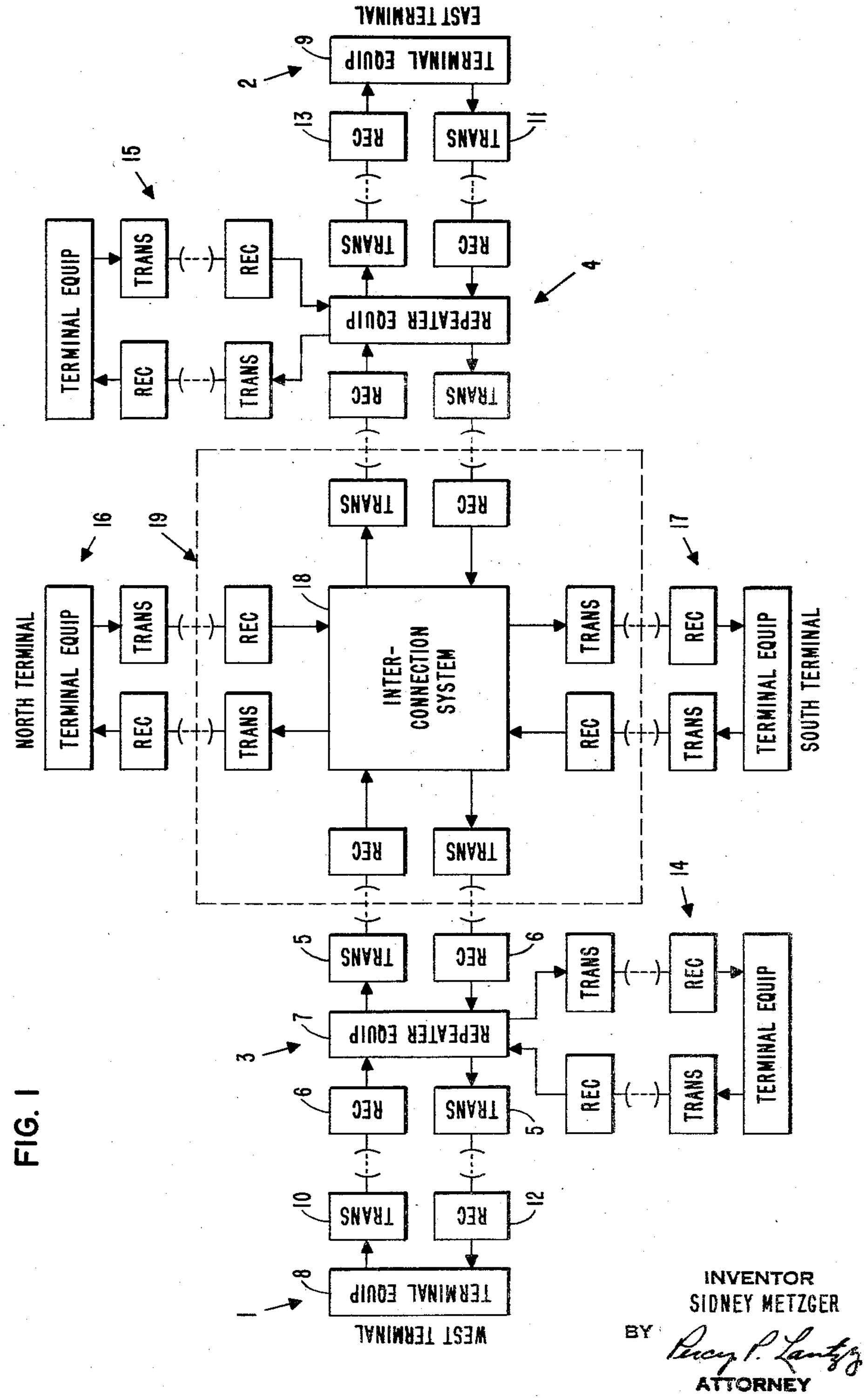
Fig. 1 is a block diagram of a typical representative microwave communication system incorporating a junction repeater station in accordance with the principles of this invention.

Referring to Fig. 1, a representive embodiment of a PTM communication system is illustrated which may be employed for supervisory control of a pipe line or a power line system. Such a communication system or link may include a western terminal 1 and an eastern terminal 2 capable of handling two-way communications therebetween via a plurality of R.-F. links including a plurality of repeater stations substantially as illustrated by station 3, where the contour of the terrain over which transmission is made requires such relaying; further, where pumping stations or distribution points on a pipe or power line are located. The repeater equipment must include besides the normal transmitter 5, receiver 6, and repeater equipment 7 for two-way communications, drop and insert equipment incorporated in equipment 7 to enable a substation to receive supervisory information destined for a particular substation and further allowing the substation to communicate with the central control station, or the extremities of the links or branches therefrom. The terminals 1 and 2 include therein conventional terminal equipment 8 and 9, transmitter 10 and 11, and receiver 12 and 13, respectively, where terminal equipment 8 and 9 have therein multiplex modulation and demodulation equipment. Further, the east-west communication link or path may have associated with given repeater stations therein, such as stations 3 and 4 herein shown, secondary branches or paths 14 and 15 extending to secondary substations removed from the main line.

The power system may be so arranged that it is necessary for the supervisory communication system to also have a main north-south branch or path, as shown in Fig. 1, where there is a northern terminal 16 and southern terminal 17 with the necessary number of repeater stations situated therebetween, or other branches and paths may be included thereon at various angles with respect to main line communication path. For descriptive purpose the system will be considered to have a 90 degree branch in crossed-relation with the east-west branch as shown. It will be obvious from the application of such a communication system that it would be desirous to have some of the information transmitted on the east-west link re-routed at the junction point to travel on the north-south link and vice versa. To accomplish this an interconnection system 18 must be employed at the junction repeater station 19 which in accordance with the principles of this invention directly re-routes channel pulses located in pulse trains received at substation 19 in a desired manner dependent upon a predetermined signal intelligence traffic flow.

Figure 2:
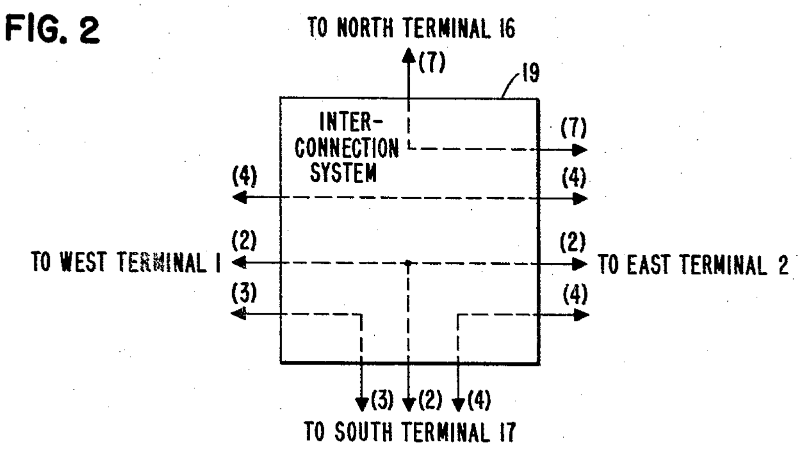
Fig. 2 is a block diagram illustrating an example of a predetermined traffic flow through a junction repeater station.

For the purpose of illustration an example of traffic flow through station 19 as shown in Fig. 2 will now be described. Fig. 2 illustrates that system 18 should be so arranged that four channels travel therethrough uninterrupted on the east-west link, two channels traveling on the east-west link must also be available for transmission to southern terminal 17, three channels coming from western terminal 1 must be available for transmission to and from southern terminal 17, four channels coming from eastern terminal 2 must be available for transmission to and from southern terminal 17, and seven channels coming from eastern terminal 2 must be available for transmission to and from northern terminal 16.

Figure 3:
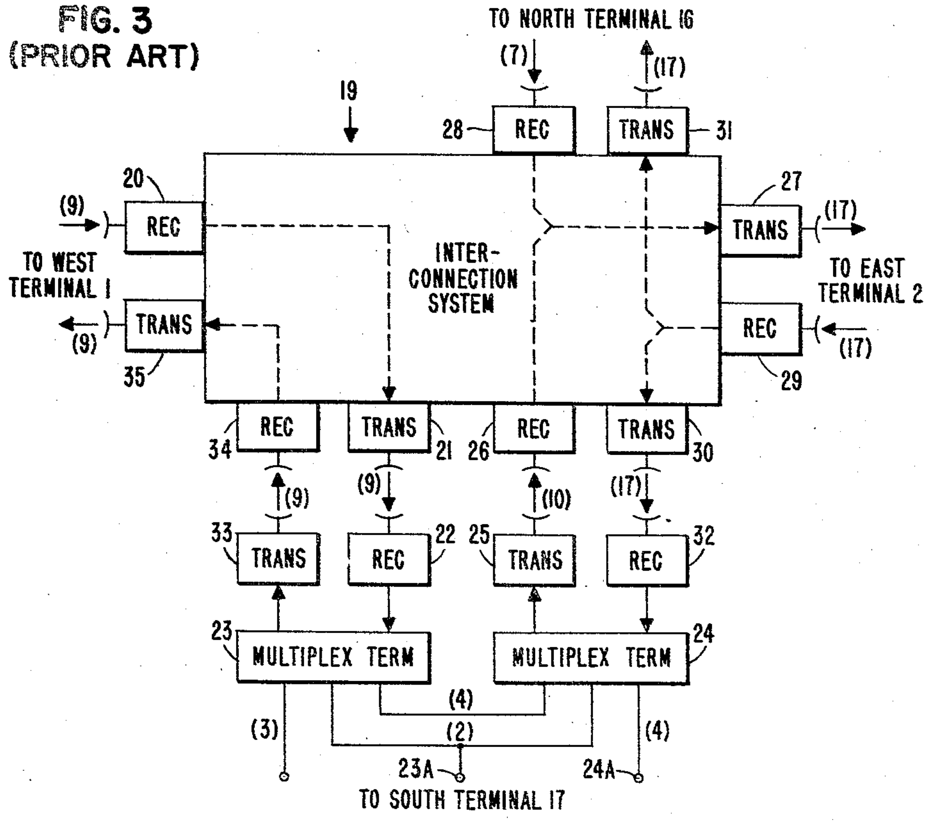
FIG. 3 (PRIOR ART)
Fig. 3 is a diagram illustrating a prior art means of obtaining the traffic flow as indicated in Fig. 2 for a system similar to Fig. 1.

A prior art interconnection arrangement is illustrated in Fig. 3 which eliminated the previously employed audio arrangement wherein all channels are demodulated, interconnecting them as desired at audio level, and then remodulating them for re-transmission to achieve a desired traffic flow through station 19. This interconnection arrangement of Fig. 3 requires that the pulse train from terminal 1 be routed through station 19 by means of receiver 20, transmitter 21 and receiver 22 to terminal 17 where all channels of this pulse train are demodulated to audio in multiplex terminal 23. A second multiplex terminal 24, properly strapped to multiplex terminal 23, is employed at southern terminal 17 for transmission to station 19 by transmitter 25 and receiver 26 connected therebetween, from where the pulse train is routed through transmitter 27 to terminal 2, transmitter 27 also receiving the pulse train from terminal 16 by means of receiver 28. The return path from terminal 2 is to receiver 29 from which the pulse train is coupled to transmitters 30 and 31 for transmission to their respective terminals. From transmitter 30 the pulse train traverses receiver 32, multiplex terminals 24 and 23, transmitter 33, receiver 34, transmitter 35, and finally terminal 1. As is obvious this means of interconnecting the crossed branches or links of a communication system effectively reduces repeater station 19 to a T junction rather than a desired X junction by adding the independent R.-F. path linking terminal 1 and terminal 17.

This means of interconnection requires the addition of an R.-F. link and multiplex terminal, but more important than the extra cost and attendant maintenance, is the fact that channel spacing is wasted by looping the traffic from terminal 1 through terminal 17 and routing of information pulses to the other terminals of the communication system. It will be noted that by sending the pulse train of seventeen channel pulses from terminal 2 to both terminals 16 and 17 permits terminal 16 to employ only seven of the seventeen channels for communication therefrom to terminal 2 and terminal 17 to employ only ten of the seventeen channel pulses for communication therefrom to terminal 2. The channel pulses allocated to each direction of transmission are indicated by the numerical values in parentheses with the useful channel indicated in Fig. 3 corresponding to the total useful channels encircled in Fig. 2. This arrangement of re-routing information pulses as illustrated in Fig. 3 is satisfactory for the present traffic requirements as indicated in Fig. 2. However, the present PTM equipment employed in such a communication system is capable of handling twenty-three channels of information per pulse train and this arrangement of Fig. 3 would not permit the operation of all the PTM equipment at its maximum capacity. For instance, adding six more channels from terminal 2 to terminal 1 by way of terminal 17 would fully load this portion of the system, but the northern link to terminal 16 still has only seven useful channels, and terminal 17 has only six useful channels at the maximum from terminal 2 as indicated at connections 23*a* and 24*a*. With the addition of the six channels of information terminal 2 is loaded to full capacity of useful channels and to handle more channels as would be required to bring the northern and southern branches to full capacity a second multiplex terminal must be added. However, as things now stand this would be useless since terminal 16 and terminal 17 cannot presently handle a second pulse train as would be required, even if synchronized, since these terminals already receive a full twenty-three channel pulse train on the single multiplex terminals. As is obvious secondary multiplex equipment at both these terminals to obtain a desired expansion to maximum capacity of the expanded PTM equipment would be highly inefficient and costly.

Figure 4:
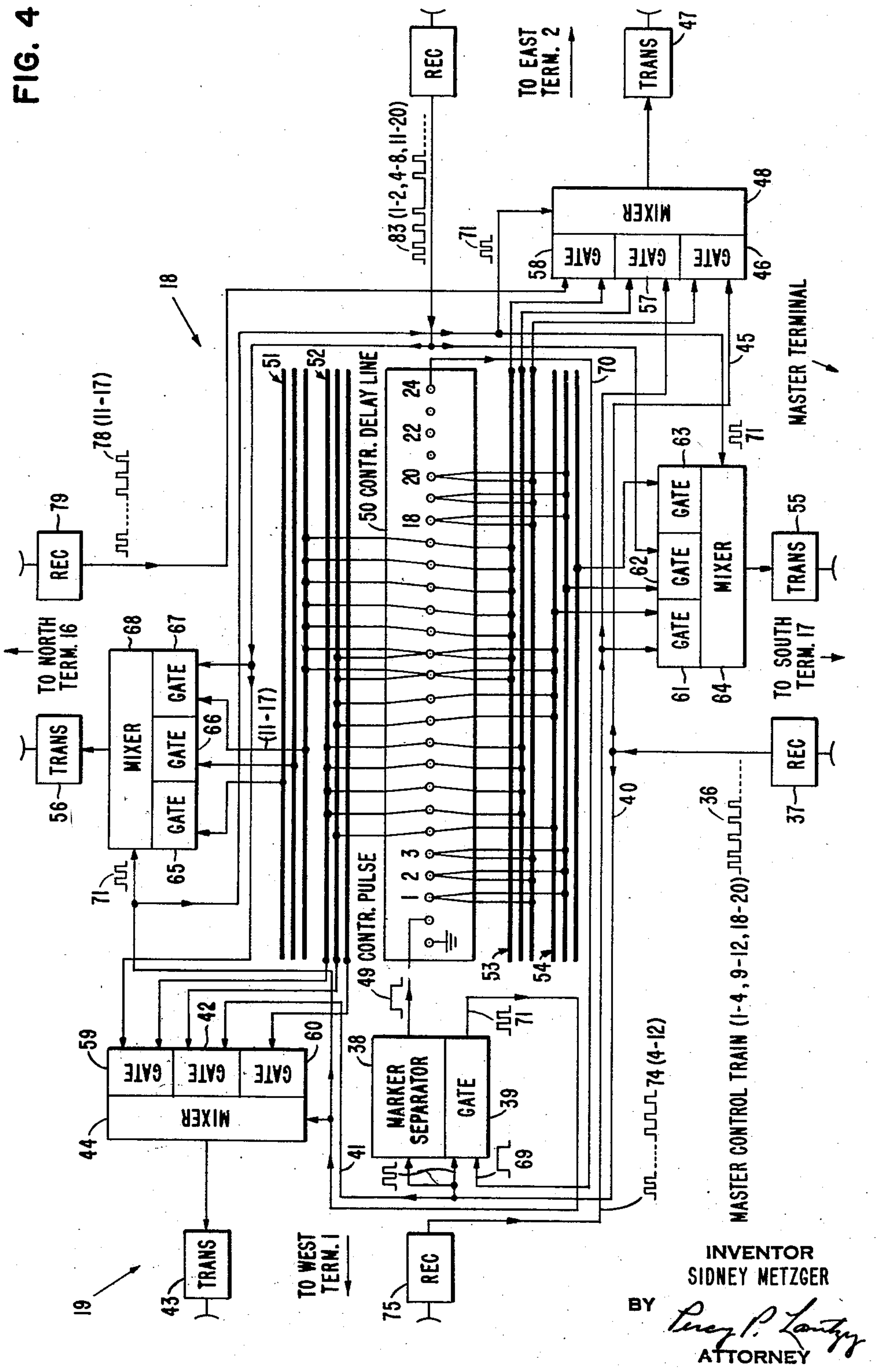
Fig. 4 is a block diagram diagrammatically illustrating the direct re-routing system in accordance with the principles of this invention for incorporation in a system similar to Fig. 1.

Referring to Fig. 4, an embodiment of this invention is shown for a particular traffic flow through junction repeater station 19 incorporating an interconnection system 18 of this invention which allows direct re-routing of the channel pulses of the received pulse train from each of the branches presently illustrated to form a pulse train for transmission to a given terminal comprising pulses from the various pulse trains arriving at station 19. Interconnection system 18 in accordance with the principles of this invention allows the expansion of the system so that all branches incorporated therein may operate at full capacity as required without wasting available channel space or addition of extra equipment as was heretofore required. It separates the branches at the junction so that the pulse trains received thereby cannot directly affect one another, for instance, failure on one branch will not interrupt service between any of the other branches. It further provides complete flexibility as regards routing of pulses from station 19 to any given branch radiating therefrom without the addition of extra equipment and without the disadvantage of demodulating to audio and interconnecting at audio with the resulting deterioration in distortion, frequency response, and crosstalk. The interconnection system of this invention herein disclosed by an embodiment of such a system referred to as system 18 provides a considerable saving in amount of equipment and initial cost, complexity, and maintenance with respect to a comparable audio junction repeater which is important since station 19 is preferably unattended.

To employ the interconnection system of this invention, an embodiment of which is shown in Fig. 4, there are two fundamental requirements: (1) All pulse trains arriving at station 19 must be synchronized to prevent any relative movement of the pulses in one train with respect to pulses in another train; (2) the phase of all pulse trains must be received in a coincident manner at station 19 or in other words all the marker pulses of the various pulse trains arriving at station 19 must arrive there simultaneously.

To provide the required synchronization I choose a pulse train emanating from one of the terminals incorporated in this system as the master pulse train. Preferably the master terminal should be the branch having the least number of intervening R.-F. links which in the present embodiment is the southern branch thereby making terminal 17 the master terminal for supplying the master control pulse train. At station 19 the master pulse train 36 is received by receiver 37 and coupled to a marker separator unit 38 and gate unit 39 over conductor 40. The master train 36 is also fed over conductor 41 to gate 42 employed to activate transmitter 43 through means of mixer 44 for ultimate transmission over the western branch from station 19. Master pulse train 36 is further coupled from receiver 37 over conductor 45 to gate 46 for activation of transmitter 47 through means of mixer 48 for ultimate transmission over the eastern branch from station 19.

The output from marker separator 38 comprises a control pulse 49 which is coupled to a delay line 50 having thereon successive taps with a predetermined sequence timing such that gating pulses are provided at each of said taps with a timing corresponding to the timing of the various channels comprising the synchronized and phased pulse trains arriving at station 19. Since all four received pulse trains are locked in the same phase, selected ones of the delay line gates may be employed to select a desired channel pulse from any pulse train depending upon a predetermined strap arrangement between the taps of delay line 50 and the gate buses 51, 52, 53, 54, each of said buses feeding a predetermined train of gate pulses to the transmitting units of station 19 to form a desired pulse train for transmission along the outgoing branches of the communication system. Depending upon the strap arrangement it is possible to make up a pulse train for transmission to any given terminals, for instance the western terminal 1, comprising several channel pulses selected from each of the other three terminal pulse trains. As an example, pulses 4, 9 to 12 might be selected from southern terminal 17, and pulses 5–8 might be selected from eastern terminal 2. Similarly, pulse trains to terminal 16, terminal 2, and terminal 17 would be made up from pulses selected from the other appropriate incoming pulse trains by means of the line 50 and a predetermined grouping of the gate pulses achieved by the various connections to buses 51–54. The marker pulse of master control train 36 is added to the four outgoing pulse trains thereby providing a means for obtaining the required synchronization between the received pulse trains emanating from the terminals of the representative communication system herein illustrated.

The diagram of Fig. 4 illustrates the circuitry employed wherein the transmitters 47, 43, 55, and 56 for transmission of pulse trains along their respective branches of the communication system from station 19 have associated therewith gating circuits 46, 57, 58, mixer 48; gating circuits 42, 59, 60, mixer 44; gating circuits 61, 62, 63, mixer 64; and gating circuits 65, 66, 67, mixer 68 respectively. As stated before master control pulse train 36 from terminal 17 is fed to marker separator 38 and gate 39 where the output from separator 38 activates delay line 50 for production of time sequence pulses, accessible by means of sequential taps. As herein illustrated the delay line is capable of producing twenty-three gating pulses, or any number of such pulses, corresponding to the possible maximum number of interleaved pulses carried by pulse trains employed in the system herein illustrated, with the various taps strapped to the appropriate buses 51, 52, 53, and 54 in a predetermined manner to provide a means for coupling an appropriate gate pulse train to each of the four branch transmitters providing a means including the gating and mixer circuits associated with a given transmitter, for selecting the pulses from the other three input trains for transmission to a given terminal. The twenty-fourth tap illustrated on line 50, or any given gating pulse therefrom, provides a means of coupling a gating pulse 69 through conductor 70 to gate 39 in a manner that provides coincidence between the marker pulse of train 36 thus allowing this marker pulse to pass therethrough. This marker pulse output designated as marker pulse 71 corresponds exactly in phase and synchronization to the marker pulse of train 36, and is coupled successively to each of the mixer circuits 44, 68, 48, and 64 for addition to the pulse train formed by the re-routing of selected ones of the pulse from the other received pulse trains providing a direct means of synchronizing each of the branch terminals in a manner that will cause the pulse trains transmitted therefrom to correspond in synchronization and phase to one another when received at station 19.

For a clearer understanding of the operation of this direct re-routing interconnection system the formation of the pulse train to be transmitted along one branch of the communication system will be followed through in detail with the understanding that the other three transmitted pulse trains are simultaneously formed in substantially the same manner. The pulse trains shown in Fig. 5 illustrate in a step-by-step manner the formation of the pulse train for transmission from station 19 to eastern terminal 2 for one predetermined strapping arrangement between delay line 50 and bus 53 and for one arrangement of designated active channels in each branch pulse train received at station 19 as illustrated in Fig. 4.

Figure 5:
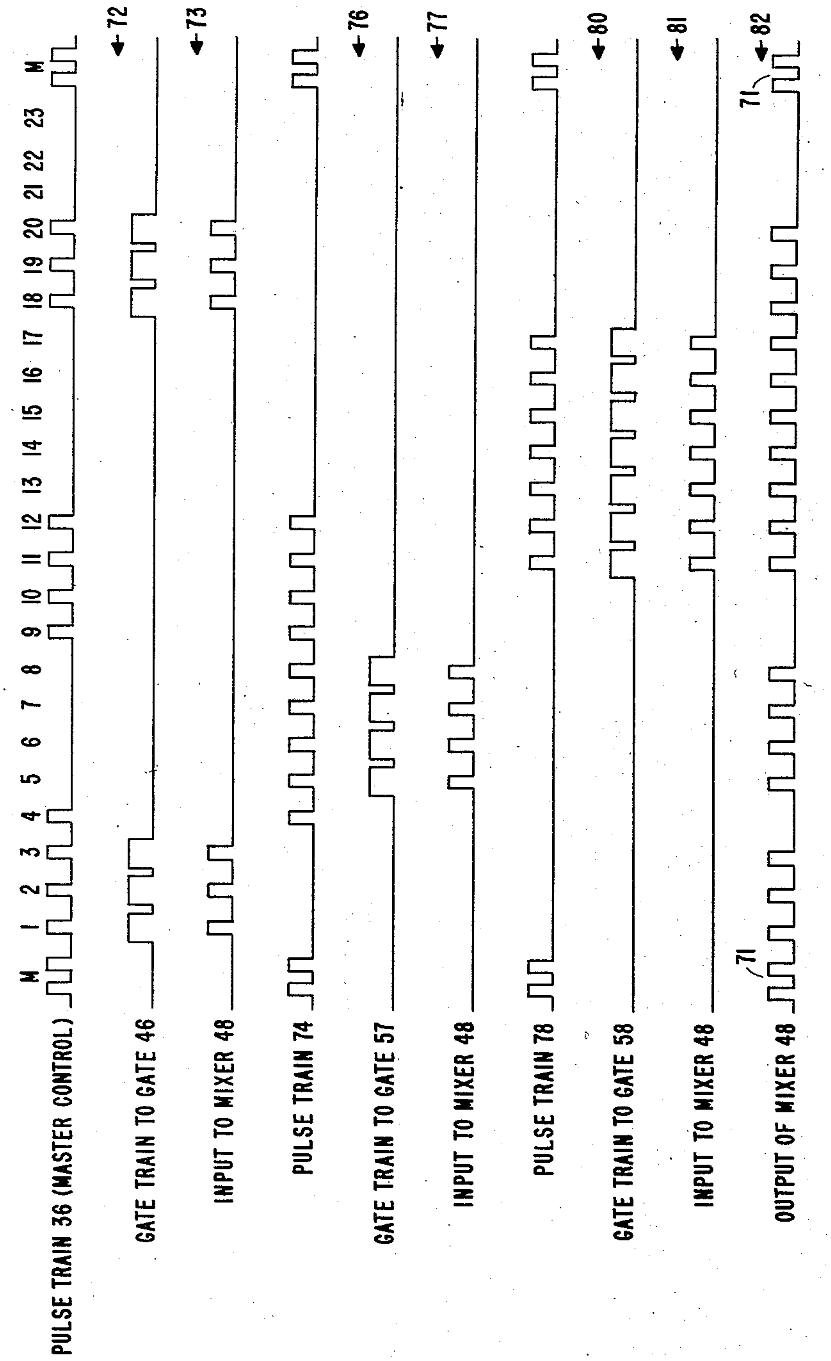
Fig. 5 is a graphical representation of the re-routing operation to form the transmission pulse train for one branch of the system in accordance to the principles of this invention.

Pulse train 36 received from terminal 17 is coupled to gate 46 which has also coupled thereto the gate pulse train 72, shown in Fig. 5, from bus 53. The coincident cooperation of gate 46 produces a pulse train 73 at the input to mixer 48. The pulse train 74 received by receiver 75 from western terminal 1 is coupled to gate 57 which has applied thereto the gate pulse train 76 from bus 53. The operation of gate 57 produces pulse train 77 for coupling to the input of mixer 48. In a similar manner pulse train 78 from terminal 16 via receiver 79 is applied to gate 58 which through coincident operation of gate 58 under the influence of gate pulse train 80 produces a pulse train 81 for application to the input of the mixer 48. Mixer 48 under the influence of the pulse trains 73, 77, and 81, and the control master pulse 71 operates to add these waveforms in time sequence such that a sequential pulse train 82 is formed, for transmission to terminal 2 or some predetermined intermediate point, from predetermined pulses of the received pulse trains 36, 74, and 78. The coincident gating operation herein employed allows the selection of only those pulses desired from pulse trains 36, 74, and 78 for transmissions from transmitter 47 in the form of pulse train 82.

The operation of forming the transmission pulse train for transmission along the other branches from station 19 is substantially identical to the formation of pulse train 82 as hereinabove described. The difference existing in the formation of the other pulse trains is that only two gate pulse trains are necessary in the conditions herein shown to form the transmission pulse trains to terminals 1 and 17, since they receive no pulse information from terminal 16, while to form the transmission pulse train to terminal 16 only one gate pulse train is required, since it receives a pulse train only from terminal 2.

One pulse train (train 36) was chosen to be the master control train to provide a means of synchronizing the four incoming pulse trains with respect to each other. However, for the other three incoming pulse trains 74, 78, and 83 to be synchronized to train 36, marker pulse 71 from gate 39 by the cooperation of the marker pulse of train 36 and the gate pulse 69 from tap 24 of delay line 50 must be added to all the transmitted pulse trains by injection into mixers 44, 48, 64, and 68. For the synchronization to be accomplished the timing oscillators at the four multiplex terminals must be locked to a common reference which in this situation means that the timing oscillator of three of the multiplex terminals are locked to the marker pulse or timing generator of the reference terminals, in the present embodiment terminal 17. The marker separator circuit at each of the terminals is activated by the marker pulse 71 carried by the pulse trains transmitted to each terminal from station 19, such that a gating pulse of desired waveform from the marker separator delay line of the individual terminals is injected into the gate circuit of each of the timing oscillators. By proper selection of the correct tap of the individual terminal marker separator delay line and a simple RC phasing circuit for fine control attached thereto, the phase of the synchronized transmitted pulse train from each individual terminal is continually adjustable with respect to the pulse train received from station 19 carrying the synchronizing marker pulse 71.

Since the operation of the direct re-routing circuit at station 19 is dependent on synchronization which in turn is dependent on the control marker pulse from terminal 17, a simple conventional relay circuit (not shown) may be provided to switch the input to the marker separator 38 from terminal 17 pulse train to the terminal 2 pulse train in the event of failure of the terminal 17 pulse train. By a proper arrangement of the relay circuit the marker separator 38 could be successively switched from terminal 17, to terminal 2, to terminal 1, to terminal 16 pulse trains in case of multiple failures. Further, a suitable delay may be provided in the relay circuit to prevent its operation from taking place during brief interruptions caused by switching to standby equipment at repeaters or other points in the communication system.

It should be noted that no adjustments are required at station 19, usually unattended, since the circuits involved are merely switching functions; they either pass or block channel pulses. This means there will be no deterioration in distortion, noise rejection, crosstalk, or frequency response.

One of the most attractive features of this pulse routing system is the expandable one. Additional channels may be passed from an incoming pulse train onto a given transmitter merely by making an additional connection from the gate train buses 51, 52, 53, and 54 to the correct delay line tap. This means adding channels is a matter of two straps per two-way channel from the present channel capacity condition to full channel capacity of the PTM equipment employed. A given delay line tap may be used to inject a gate pulse into more than one gate train, but in such a situation an isolation resistor network (not actually shown) must be employed and are represented by the plurality of lines coming from each tap. It must be remembered that the active channels allotted to each branch of the communication system and the strapping arrangement shown for the production of the gating pulse trains may be altered as desired to best suit a particular application of such a communication system. Also, the total number of channels per train may be varied greatly. Further the number of branches operating into and out of station 19 may be varied in number by judicial arrangement of the gating means including the buses strapped to the delay line 50 and the connection of these buses to the gate circuits incorporated at the transmitters of station 19 for transmission along the various branches of this system. It is well to note that the number of gating circuits at each transmitter equal in number one less than the number of total branches while the buses of delay line 50 equal in number the total number of branches radiating from station 19 with the segments of each bus equaling the maximum number of gating circuits associated with each of the branch transmitters.

While I have described above the principles of my invention in connection with specific apparatus, it is to be clearly understood that this description is made only by way of example and not as a limitation to the scope of my invention as set forth in the objects thereof and in the accompanying claims.

I claim:

1. A multiplex pulse communication system wherein a marker pulse is followed by a train of interleaved channel pulses comprising a plurality of two-way communication paths converging at a given junction and a repeater station disposed at said junction, each of said communication paths including at least one terminal station remote from said junction capable of handling two-way communication, said repeater station including a transmitter and receiver for each of said communication paths and an interconnection means disposed in said repeater station coupled between each of the transmitters and receivers of said repeater station to directly re-route in said repeater station selected channel pulses of certain of the pulse trains received at said repeater station to the transmitter of given ones of said communication paths for transmission from said repeater station of a pulse train comprising certain of said selected channel pulses.

2. A system according to claim 1, wherein the pulse train of a selected one of said communication paths is the master control train and said interconnection means includes means for separating the marker pulse of said master control train for synchronizing the pulse trains in both directions on each of said communication paths.

3. In a multiplex pulse communication system of the type described, a junction repeater station disposed at the junction of a plurality of converging communication paths, said repeater station including a transmitter and receiver for each of said communication paths and an interconnection means disposed in said repeater station coupled between each of said transmitters and receivers to directly re-route in said repeater station selected channel pulses of certain of the pulse trains received at said repeater station to the transmitter of given ones of said communication paths for transmission from said repeater station of a pulse train comprising certain of said selected channel pulses.

4. A multiplex pulse communication system wherein a marker pulse is followed by a train of interleaved channel pulses comprising a plurality of two-way communication paths interconnected at a given junction, each of said communication paths including at least one terminal station capable of handling two-way communication, and a repeater station disposed at said junction including a transmitter and receiver for each of said communication paths and an interconnection means at said repeater to directly re-route selected channel pulses of certain of the received pulse trains to the transmitter of given ones of said communication paths for transmission therefrom of a pulse train comprising certain of said selected channel pulses, the pulse train of a selected one of said communication paths being the master control train and said interconnection means includes means for separating the marker pulse of said master control train for synchronizing the pulse trains on each of said communication paths, said interconnection means further comprises a means responsive to said separated marker pulse to produce a plurality of different gating pulses each synchronized for a different channel position of said pulse trains, a plurality of gating means associated with each of said transmitters, means to apply certain of the received pulse trains to said gating means, means to apply a selected group of said gating pulses to said gating means for selection of certain pulses of said received pulse trains, and combining means for each of said transmitters for combining the outputs of said gating means to form a pulse train of said selected pulses for transmission over a given one of said communication paths.

5. A system according to claim 4, wherein said interconnection means further includes a gating circuit responsive to the simultaneous application of the marker pulse of said master control train and one of said gating pulses to provide a synchronized marker pulse at said combining means for transmission over each of said communication paths to synchronize the pulse trains received by said junction repeater station.

6. A multiplex pulse communication system wherein a marker pulse is followed by a train of interleaved channel pulses comprising a plurality of two-way communication paths interconnected at a given junction, each of said communication paths including at least one terminal station capable of handling two-way communication, and a repeater station disposed at said junction including a transmitter and receiver for each of said communication paths and an interconnection means at said repeater to directly re-route selected channel pulses of certain of the received pulse trains to the transmitter of given ones of said communication paths for transmission therefrom of a pulse train comprising certain of said selected channel pulses, said interconnection means comprising a control means responsive to a selected one of said pulse trains for production of a plurality of different gating pulses each synchronized for a different channel position of said received pulse trains, a plurality of gating means associated with each of said transmitters, means to apply selected ones of said received pulse trains to certain of said gating means, means to apply a predetermined grouping of said gating pulses to said certain gating means for selection of certain channel pulses of said received pulse trains, and means combining the output of the gating means of each of said transmitters to form pulse trains of selected channel pulses for transmission over said communication paths.

7. A system according to claim 6, wherein said control means further includes a gating device responsive to the simultaneous application of the marker pulse of said selected pulse train and a selected one of said gating pulses to provide a synchronized marker pulse at each of said combining means for transmission in the proper relationship with said formed pulse train over each of said communication paths providing a means to synchronize the pulse trains emanating from said terminal stations.

8. In a multiplex pulse communication system of the type described, a junction repeater station disposed at the junction of a plurality of communication paths disposed in an interconnected relationship including a transmitter and receiver for each of said communication paths and an interconnection means at said repeater to directly re-route selected channel pulses of certain of the received pulse trains to the transmitter of given ones of said communication paths for transmission therefrom in the form of a pulse train comprising certain of said selected channel pulses, said interconnection means comprising a means responsive to a given pulse of a selected one of said received pulse trains to produce a plurality of sequentially timed gating pulses each synchronized for a different channel position of said received pulse trains, a plurality of gating means associated with each of said transmitters activated by the simultaneous application of received pulse trains and selected groupings of said gating pulses, and combining means for each of said transmitters for combining the output of said gating means for the development of a pulse train comprising certain of said selected pulses for transmission over said communication paths.

9. In a system according to claim 8, wherein said interconnection means further includes a gating circuit responsive to the simultaneous application of said given pulse and one of said gating pulses to provide a synchronized marker pulse at each of said combining means for transmission over each of said communication paths appropriately located with respect to the interleaved pulses of said transmitted pulse train for synchronization of the pulse trains received at said repeater station.

10. In a multiplex pulse communication system of the type described, a junction repeater station disposed at the junction of a plurality of communication paths disposed in an interconnected relationship including a transmitter and receiver for each of said communication paths and an interconnection means at said repeater to directly re-route selected channel pulses of certain of the received pulse trains to the transmitter of given ones of said communication paths for transmission therefrom in the form of a pulse train comprising certain of said selected channel pulses, said interconnection means comprising a control means responsive to a given pulse of a selected one of said pulse trains to produce a plurality of sequentially timed gating pulses each corresponding to the timing of a different channel position included in each of said pulse trains, a plurality of gating means associated with each of said transmitters activated by the simultaneous occurrence of selected channel pulses of certain of said received pulse trains and selected groupings of said gating pulses, combining means for each of said transmitters for combining the output of said gating means corresponding to certain selected pulses of said received pulse trains, and a gating circuit responsive to the simultaneous occurrence of said given pulse and the selected one of said gating pulses to provide a synchronized marker pulse at each of said combining means, said synchronized marker pulse and said output of said gating means forming a pulse train for transmission over each of said communication paths wherein said marker pulse provides a means to synchronize the pulse trains received by said junction station.

References Cited in the file of this patent

UNITED STATES PATENTS

| | | |
|---|---|---|
| 2,429,613 | Deloraine et al. | Oct. 28, 1947 |
| 2,471,138 | Bartelink | May 24, 1949 |
| 2,666,845 | Colton et al. | Jan. 19, 1954 |